US011408547B2

(12) United States Patent
Tutor

(10) Patent No.: US 11,408,547 B2
(45) Date of Patent: Aug. 9, 2022

(54) MODULAR HOPPER TEE AND METHOD OF USING SAME

(71) Applicant: Bailey-Parks Urethane, Inc., Memphis, TN (US)

(72) Inventor: Brian Tutor, Memphis, TN (US)

(73) Assignee: Bailey-Parks Urethane, Inc., Memphis, TN (US)

( * ) Notice: Subject to any disclaimer, the term of this patent is extended or adjusted under 35 U.S.C. 154(b) by 224 days.

(21) Appl. No.: 16/589,948

(22) Filed: Oct. 1, 2019

(65) Prior Publication Data

US 2020/0041058 A1   Feb. 6, 2020

Related U.S. Application Data

(62) Division of application No. 15/216,198, filed on Jul. 21, 2016, now Pat. No. 10,473,254.

(60) Provisional application No. 62/196,770, filed on Jul. 24, 2015.

(51) Int. Cl.
| *B23P 6/00* | (2006.01) |
| *F16L 41/02* | (2006.01) |
| *B65G 53/52* | (2006.01) |
| *B65G 53/46* | (2006.01) |

(52) U.S. Cl.
CPC ............... *F16L 41/021* (2013.01); *B23P 6/00* (2013.01); *B65G 53/46* (2013.01); *B65G 53/523* (2013.01); *B65G 2207/48* (2013.01)

(58) Field of Classification Search
CPC . F16L 41/21; F16L 41/03; F16L 41/08; F16L 41/12; B65G 53/46; B65G 53/523; B65G 2207/48; B23P 6/00; B23P 2700/11
See application file for complete search history.

(56) References Cited

U.S. PATENT DOCUMENTS

| 6,996,976 B2 * | 2/2006 | Rumminger | .......... F01N 13/008 204/421 |
| 2005/0230099 A1 * | 10/2005 | Thomson | ............ E21B 33/0415 166/78.1 |

FOREIGN PATENT DOCUMENTS

EP    1199505 A2 *  4/2002  ............ F16L 41/021

* cited by examiner

*Primary Examiner* — Christopher J Besler
(74) *Attorney, Agent, or Firm* — C. Brandon Browning; Maynard, Cooper & Gale, PC

(57) ABSTRACT

A modular hopper tee including a modified tee box, a tee box liner, a readily detachable inflow adapter for coupling a first pipe to the tee box and a readily detachable outflow adapter for coupling a second pipe to the tee box, the liner and adapters being constructed from an elastomeric polymer such as polyurethane. Each of the inflow and outflow adapters includes a flange portion and a cylinder portion extending through the flange portion, the flange portion dividing the cylinder portion into a first cylinder portion that extends through a sidewall opening of the tee box and sealingly engages the liner and a second cylinder portion that is located outside of the box. A metal cylinder member, which is embedded within the first cylinder portion and surrounds an exterior of the second cylinder portion, is provided for reinforcing the adapter.

4 Claims, 11 Drawing Sheets

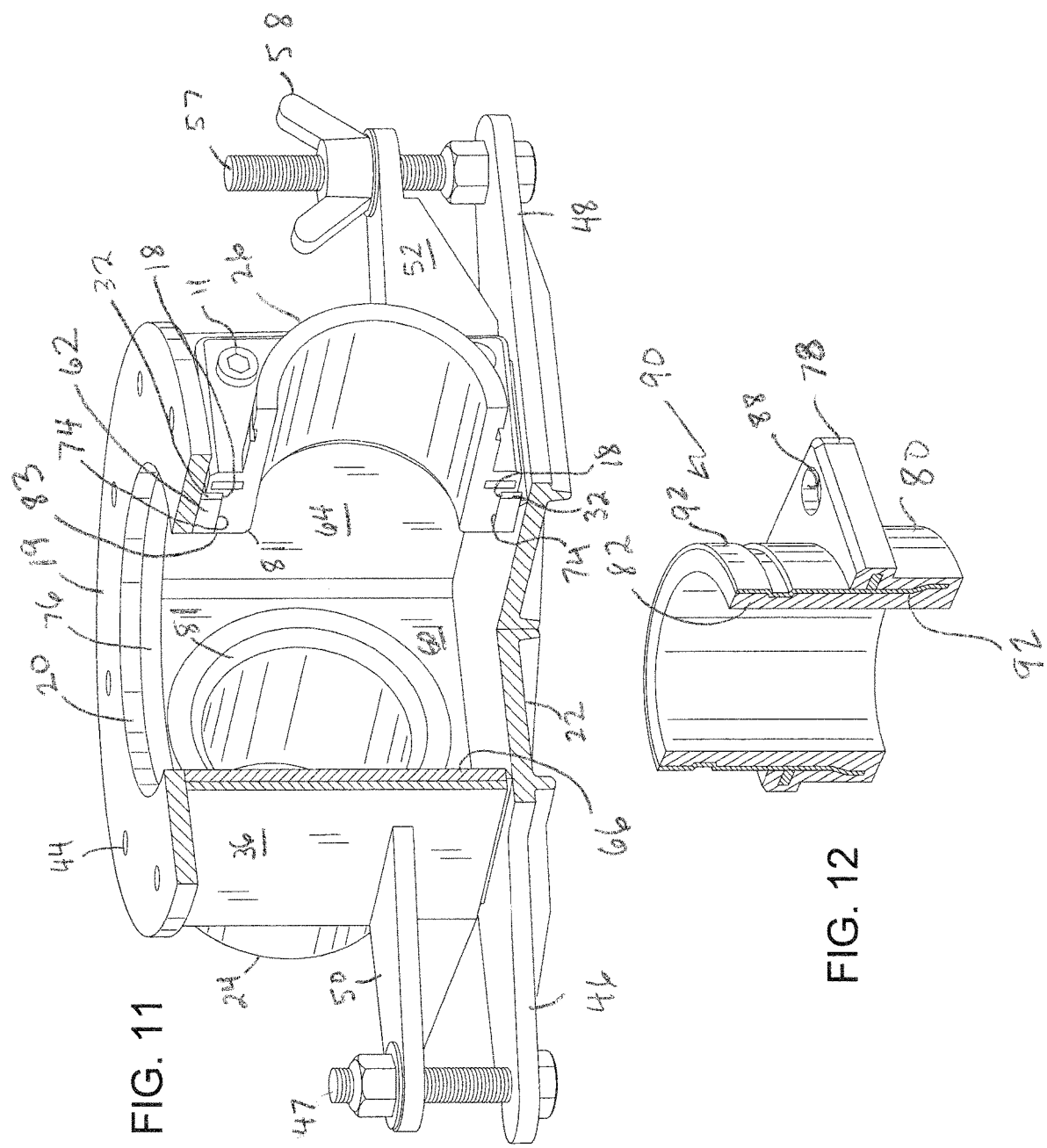

MODULAR HOPPER TEE AND METHOD OF USING SAME

RELATED APPLICATION

This application is a divisional of and claims priority to U.S. application Ser. No. 15/216,198 filed on Jul. 21, 2016 and U.S. Provisional Application No. 62/196,770, filed on Jul. 24, 2015, both titled "Modular Hopper Tee and Method of Using Same," the entire contents of which are incorporated herein by reference.

FIELD OF THE INVENTION

The present invention relates to a hopper tee, and more particularly, to a modular bottom drop hopper tee including a modified tee box, a tee box liner, a readily detachable inflow adapter for coupling a first pipe to the tee box and a readily detachable outflow adapter for coupling a second pipe to the tee box, the liner and adapters being constructed from an elastomeric polymer such as polyurethane.

BACKGROUND OF THE INVENTION

Hopper tees are known in the art. For example, U.S. Pat. No. 4,889,318 discloses a molded hopper tee for a hopper truck. The molded hopper tee includes a first vertically directed hollow pipe section including a laterally outwardly directed flange at an upper end thereof for attachment to the bottom of a hopper. A second hollow pipe section extends transversely to the first hollow pipe section and extends beyond the first hollow pipe section on opposite sides thereof and terminates in opposite free ends for attachment to pipeline tubing at a discharge location. Bulk granular material particles are pneumatically unloaded from the hopper and routed first through the vertically and horizontally directed hollow pipe sections and then into the pipeline tubing. The integral first and second hollow pipe sections are integrally molded from a polymer material.

U.S. Pat. No. 4,848,396 discloses a one-piece hopper tee including a vertically directed hollow pipe section having a laterally outwardly direct flange at an upper end thereof for attachment to the bottom of a hopper truck. At the other end of the vertical pipe section, a transversely extending hollow pipe section is provided, with the opposite free ends thereof capable of being attached to pipeline tubing, through which pneumatic unloading of product obtained in the hopper truck may be routed first through the vertically and horizontally directed pipe sections and then into the pipeline tubing. In the area of juncture between the vertically and horizontally directed pipe sections, smooth internal transitional surfaces are provided which permit complete and continuous flow of product discharged from the hopper into the vertically directed pipe section, and subsequent flowing without impedance into the generally horizontally extending pipe section, for entry into pipeline tubing connected thereto. An inner molded lining having a low coefficient of friction conforming to the smooth internal transitional surfaces is also disclosed.

U.S. Pat. No. 5,387,015 discloses a one piece cast hopper tee having a vertically directed hollow pipe section with a flange at an upper end thereof for attachment to the bottom of a hopper truck. The bottom end of the vertical pipe section flares outward at the juncture with a horizontal pipe section creating an elliptical opening from the vertical pipe into the horizontal pipe. In the area of juncture between the two pipes smooth and uninterrupted internal transition surfaces are provided to permit complete and continuous flow of product from the vertical pipe to the horizontal pipe. A pair of wear saddles, one on each side of the external juncture of the flared section of vertical pipe with the horizontal pipe create wear resistant areas having approximately double the wall thickness of the pipe sections. A substantially thicker wall section is formed in the horizontal pipe opposite the elliptical opening.

U.S. Patent Application Publication No. 2013/0307262 discloses a hopper tee having a horizontal portion through which granular material is unloaded from a tank trailer or hopper car. The hopper tee integrally forms a vertical segment, that secures with the bottom of the hopper, to provide for unloading of granular material for usage or storage. The upper front portion of the tee, as it transitions from its vertical segment to the horizontal flow path has secured or cast therewith a ledge, that provides for accumulation of the unloading granular material therein, to function as a wear pad to resist against abrasion, and accelerated wear out, of the tee, at that location, during prolonged usage.

U.S. Patent Application Publication No. 2013/0333779 discloses a hopper tee for redirecting the flow of material from one passage to another passage, the hopper tee including a radius providing a transition between the passages. A port at the exterior of the radius includes an upwardly-open cavity having a bottom wall disposed within the radius and forming a sacrificial wall extending between the bottom wall and the inner surface of the radius. The cavity provides an indication that material moving through the tee has worn the wall of the radius by the creation of a passage between the interior of the tee and the cavity and expelling material through the passage to the exterior of the tee. A plug is secured within the cavity allowing a user to continue to use the tee until the tee is rotated or replaced. The radius includes a thickened wall for providing added structural support and sacrificial material.

Each hopper tee described above is designed to address the problem a wear resulting from the impact of particulates such as sand, gravel and grains, as the particulates empty into and travel through the hopper tee. A shortcoming of each of the hopper tees designs is that, while they may prolong the life of the hopper tees, they all require either expensive repairs or replacement of the entire hopper tee upon there being wear damage to any part of the hopper tee. Accordingly, there is needed a method by which those portions of the hopper tee that most often suffer wear damage can be easily removed and replaced, while continuing to make use of the undamaged portions of the hopper tee.

SUMMARY OF THE INVENTION

The present invention is directed to a modular bottom drop hopper tee including a modified tee box, a tee box liner, a readily detachable inflow adapter and a readily detachable outflow adapter, the liner and adapters being manufactured from a polymer such as a thermoplastic and/or elastomeric polymer. An exemplary polymer is polyurethane. The hopper tee is used at the base of dry bulk tank hoppers and can be used as either a straight tee by using pneumatic conveyance, or a bottom drop tee by gravity dropping dry goods through the bottom of the hopper tee.

According to one aspect of the invention there is provided a hopper tee including a box having a continuous sidewall, an upper opening, a lower opening, a first side wall opening and a second sidewall opening arranged opposite to the first sidewall opening. A flange having a flange opening is coupled to a top of the box, the flange opening being arranged to provide access into the box through the upper opening. An elastomeric polymer liner covers the entirety of an inner surface of the continuous sidewall and a lower surface portion of the flange that is bounded by the top of the box. The liner can be molded apart from the box and then adhered within the box, or it can be molded directly within the box using means known in the art. For example, the inner surface of the box can be textured by sandblasting and then coated with a bonding agent. A mold can then be inserted into the box and molten polyurethane poured between the box and mold.

An elastomeric polymer first adapter is detachably coupled with the first sidewall opening. The first adapter includes a flange portion and a cylinder portion extending through the flange portion, the flange portion being detachably coupled to the box and dividing the cylinder portion into a first portion that extends through the first sidewall opening and a second portion that is located outside of the box. The first portion of the cylinder portion has a free end that is flush with an inner surface of the liner and includes a curved or angled annular surface. The curved or angled annular surface is arranged within the box at a location that often suffers from wear damage. A second adapter having a design identical to that of the first adapter is fluidly coupled to the second sidewall opening.

When the first adapter is damaged or worn, it can be replaced by unbolting the flange portion from the box and fluidly coupling an elastomeric polymer third adapter to the first side wall opening. Unlike conventional hopper tees, the first adapter can be replaced without removing the hopper tee from a hopper trailer or bulk hopper. Alternatively, the operational life of the hopper tee can be prolonged by detaching the flange from a trailer hopper, uncoupling the first adapter from an outflow pipe, uncoupling the second adapter from an inflow pipe and rotating the box 180°. The flange and box are then reattached to the hopper trailer with the first adapter being coupled to the inflow pipe and the second adapter being coupled to the inflow pipe.

According to another aspect of the invention there is provided a hopper tee including a metal box attached to an outlet of a trailer hopper. An elastomeric polymer liner is located within the box, the liner having a continuous sidewall, a top opening arranged to receive a particulate material from the outlet of the trailer hopper, a first sidewall opening and a second sidewall opening that is opposite the first sidewall opening. An elastomeric polymer first adapter having a first cylinder portion is inserted into the first side wall opening and sealingly engaged with the liner. A second cylinder portion is located outside of the box and coupled to a pipe that is operatively coupled to a second hopper tee.

According to yet another aspect of the invention there is depicted a hopper tee including a box operatively coupled to an outlet of a trailer hopper, the box including a selectively closable bottom door and an elastomeric polymer liner having a top opening, a first sidewall opening and a second sidewall opening that is substantially opposite the first sidewall opening. An elastomeric polymer first adapter having a first cylinder portion is inserted into the first sidewall opening and engaged with the liner. A second cylinder portion is located outside of the box and coupled to a pipe that is operatively coupled to a second trailer hopper. The first cylinder portion has a free end that is flush with an inner surface of the liner and that includes a curved annular surface. A reinforcing metal cylinder member surrounds an exterior surface of the second cylinder portion and extends into of the first cylinder portion where it is embedded to ensure a sealing engagement of the first portion with the polymer liner.

BRIEF DESCRIPTION OF THE DRAWINGS

FIG. 11 is a 90° cut-away view of the hopper tee of FIG. 1.

FIG. 12 is a sectional view of a metal-reinforced adapter in accordance with another embodiment of the present invention.

DETAILED DESCRIPTION OF PRESENTLY PREFERRED EMBODIMENTS

Figure 1:
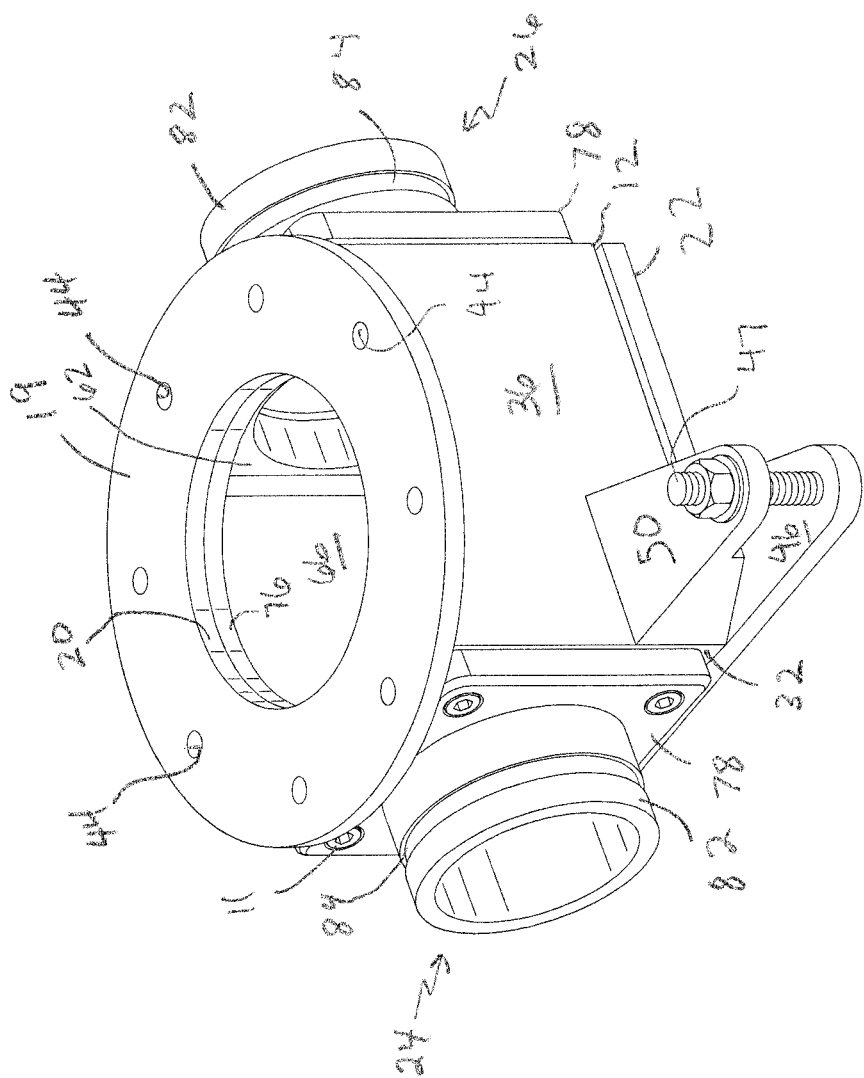
FIG. 1 is a top perspective view of a first side of a modular bottom drop hopper tee in accordance with the present invention.
Figure 2:
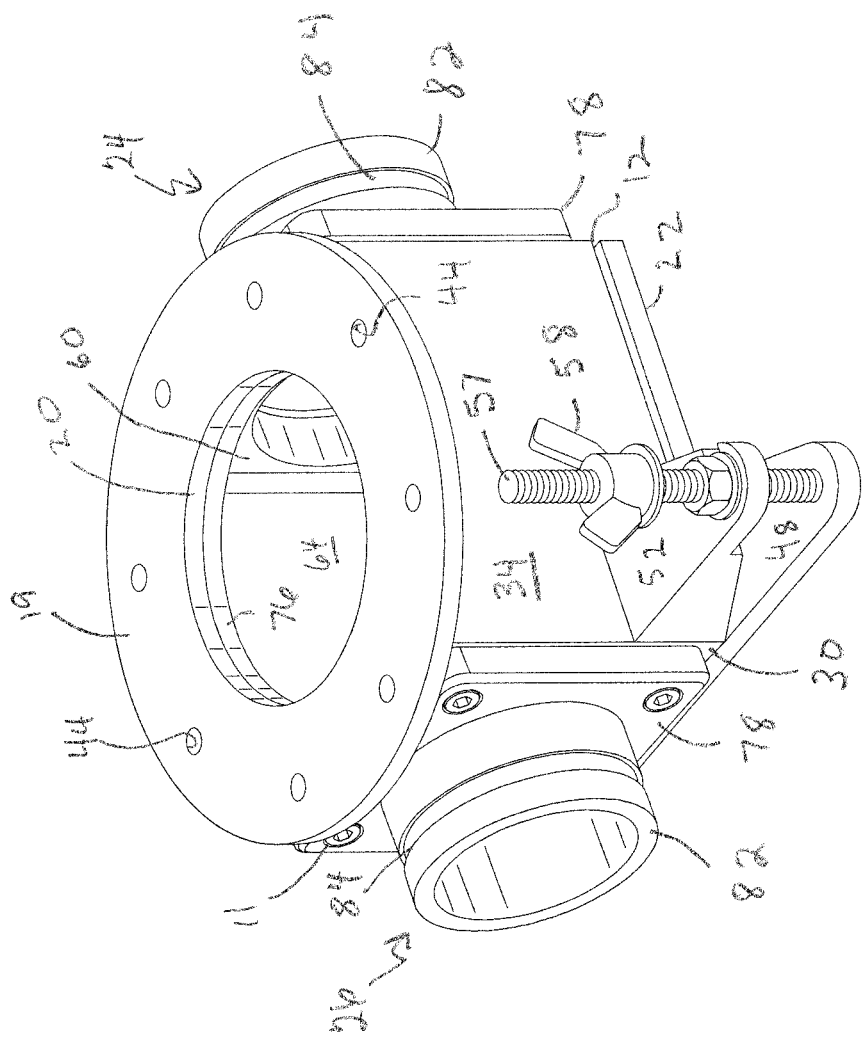
FIG. 2 is a top perspective view of a second side of the hopper tee of FIG. 1.

The present invention is directed to a modular hopper tee 10 including a metal box 12 having a continuous sidewall, an open top, an open bottom 14, a first sidewall opening 16 and a second sidewall opening 18 arranged opposite to and aligned with the first sidewall opening. A flange 19 is attached to the open top of box 12 for coupling box 12 to a bulk hopper outlet, the flange including an inlet 20 for receiving dry, particulate materials such as sand, gravel and grains, from the hopper. A door 22 is pivotally coupled to box 12 and arranged to selectively close open bottom 14 when hopper tee 10 is to be used as a straight tee for pneumatic conveyance of materials, or uncover open bottom 14 when hopper tee 10 is to be used for gravity dropping of particulate materials out of box 12. An elastomeric polymer outflow adapter 24 is detachably coupled with first sidewall opening 16 for directing materials out of box 12, and an elastomeric polymer inflow adapter 26 is detachably coupled with second sidewall opening 18 for directing forced air and, optionally, additional particulate materials, into box 12. An elastomeric polymer box liner 28 covers an inner surface of box 12 and sealingly engages with adapters 24 and 26 so that the particulate materials, when pneumatically conveyed through the box and adapters, do not contact and thereby wear down any metal portion of the box 10. In this manner, adapters 24 and 26 and liner 28 are configured to prolong the operational life of hopper tee 10 and, additionally, allow for damaged portions of hopper tee 10 to be easily and quickly repaired. Such repairs, unlike convention hopper tee repairs, can be made while hopper tee 10 remains attached to the bulk hopper outlet.

More particularly, as depicted in FIGS. 1 through 3 and 7, box 12 includes four vertically extending walls including a first wall 30, a second wall 32, a third wall 34 and a fourth wall 36, the upper edges thereof defining the open top of box 12 and the lower edges thereof defining open bottom 14. First sidewall opening 16 extends through first wall 30, and second sidewall opening 18 extends through second wall 32. Located about each of openings 16 and 18 are four bolt holes 38 for attaching adapters 24 and 26, respectively, to box 12 using bolts 11. Bolt 38 holes may be smooth or threaded. While box 12 is shown as forming a square enclosure, it is understood that box 12 can form a rectangular enclosure, a circular enclosure or any other shaped enclosure known in the art.

Welded to the upper edges of walls 30, 32, 34 and 36 is metal flange 19. Flange 19 forms a continuous seal about the open top of box 12. Flange 19 includes an overhang portion 40 extending outside and entirely around the periphery of box 12 and another portion located inside of the periphery of box 12 that partially encloses the open top of box 12 and thereby forms a top wall 42 of box 12. Inlet 20 extends through top wall 42 and provides a pathway by which a particulate material may be dropped into and through box 12 from a bulk hopper. Extending through overhang portion 40 is a plurality of bolts holes 44. Bolt holes 44 are used for fastening box tee 10 a bulk hopper.

Figure 4:
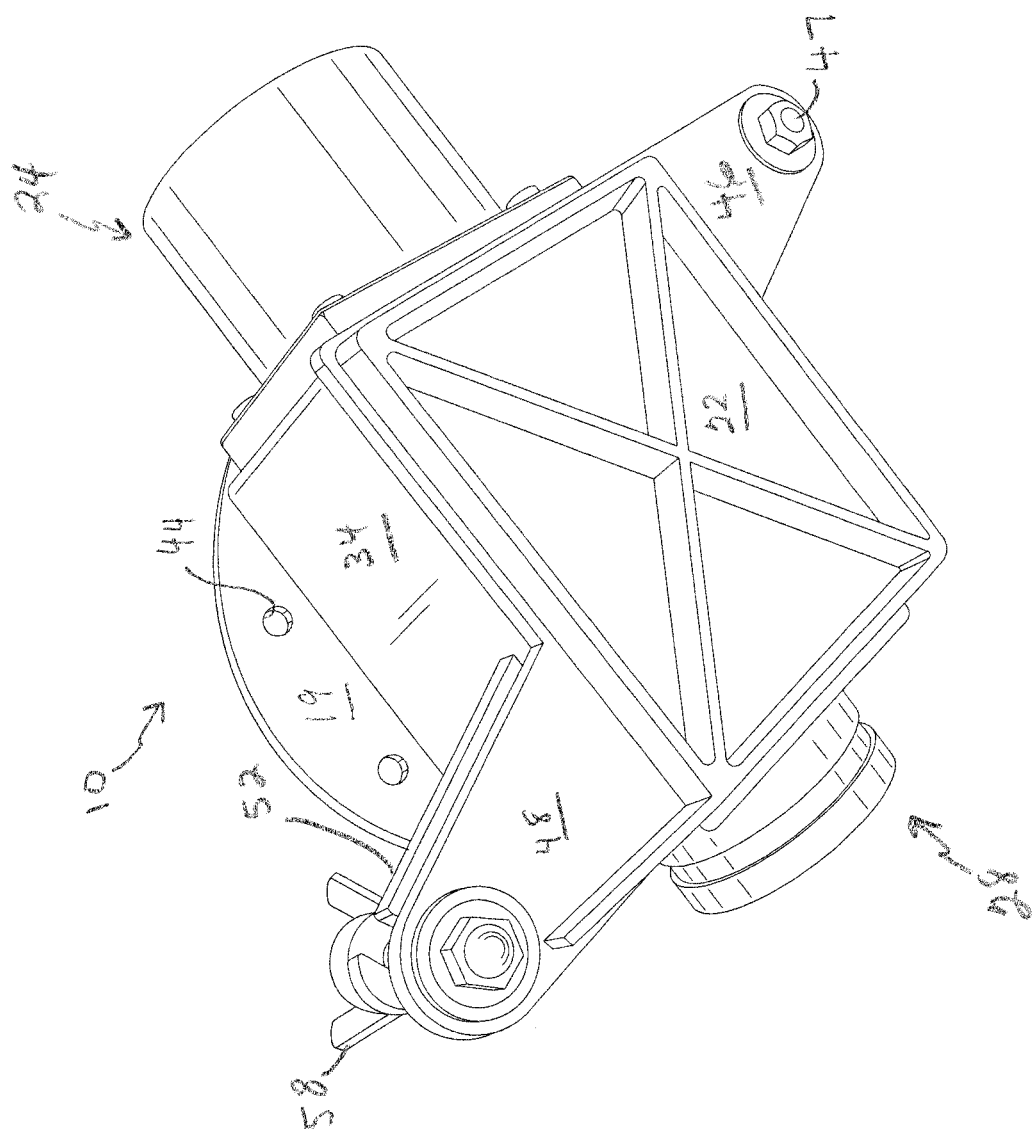
FIG. 4 is a perspective view of a bottom the hopper tee of FIG. 1 showing a welded tee box door in a closed position.
Figure 5:
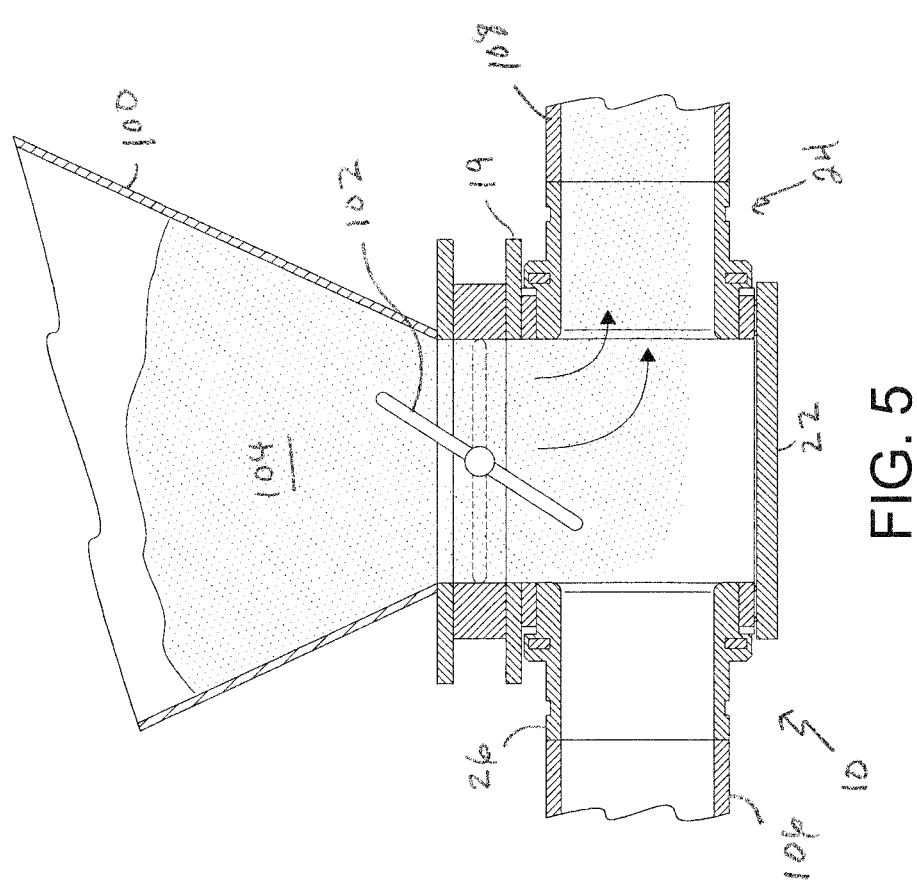
FIG. 5 is a sectional view of the hopper tee of FIG. 1 coupled to an outlet of a hopper illustrating a particulate material flow from the hopper, into the hopper tee and out of an outflow adapter of the hopper tee.
Figure 7:
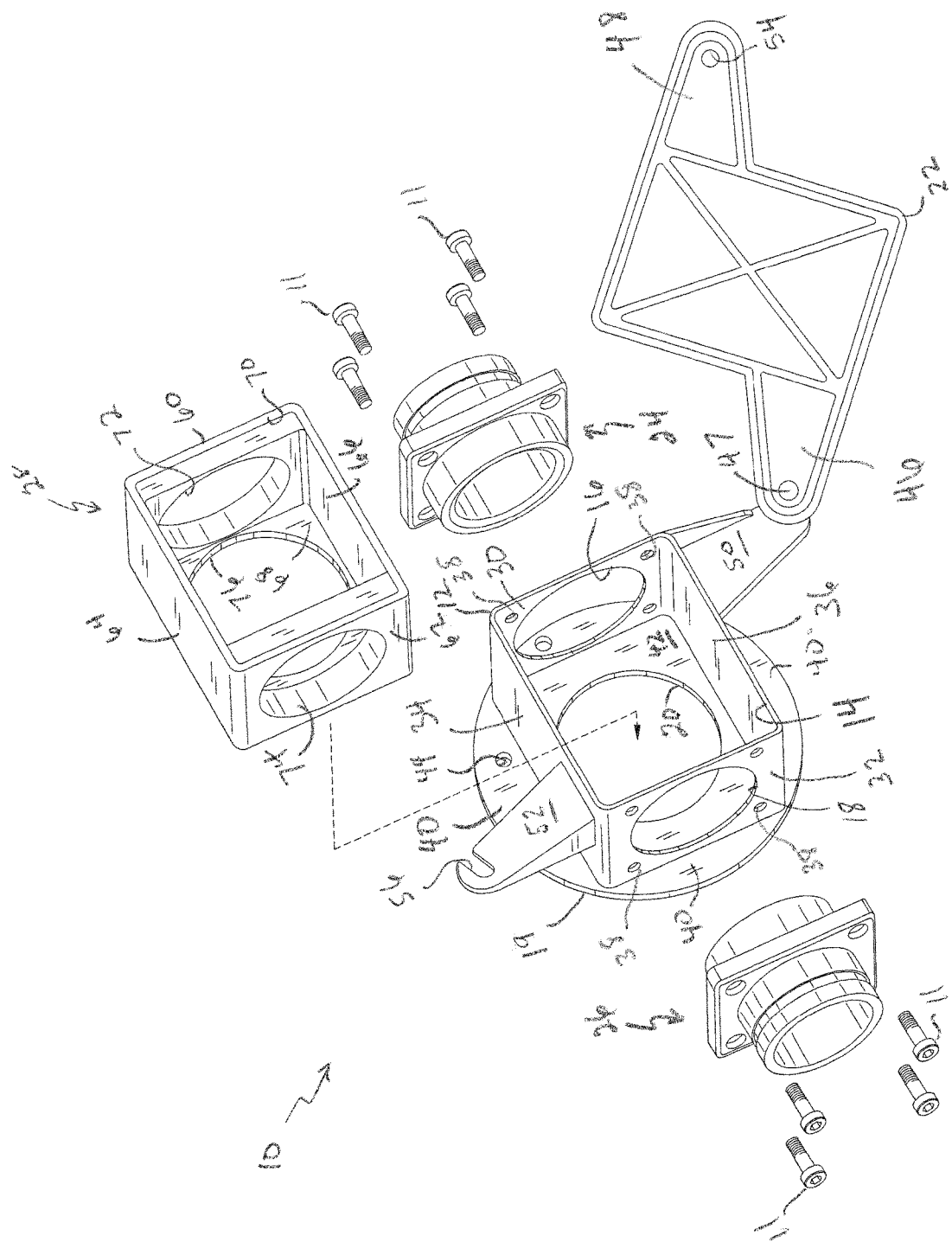
FIG. 7 is a partially exploded view of a bottom of the hopper tee of FIG. 1.
Figure 8:
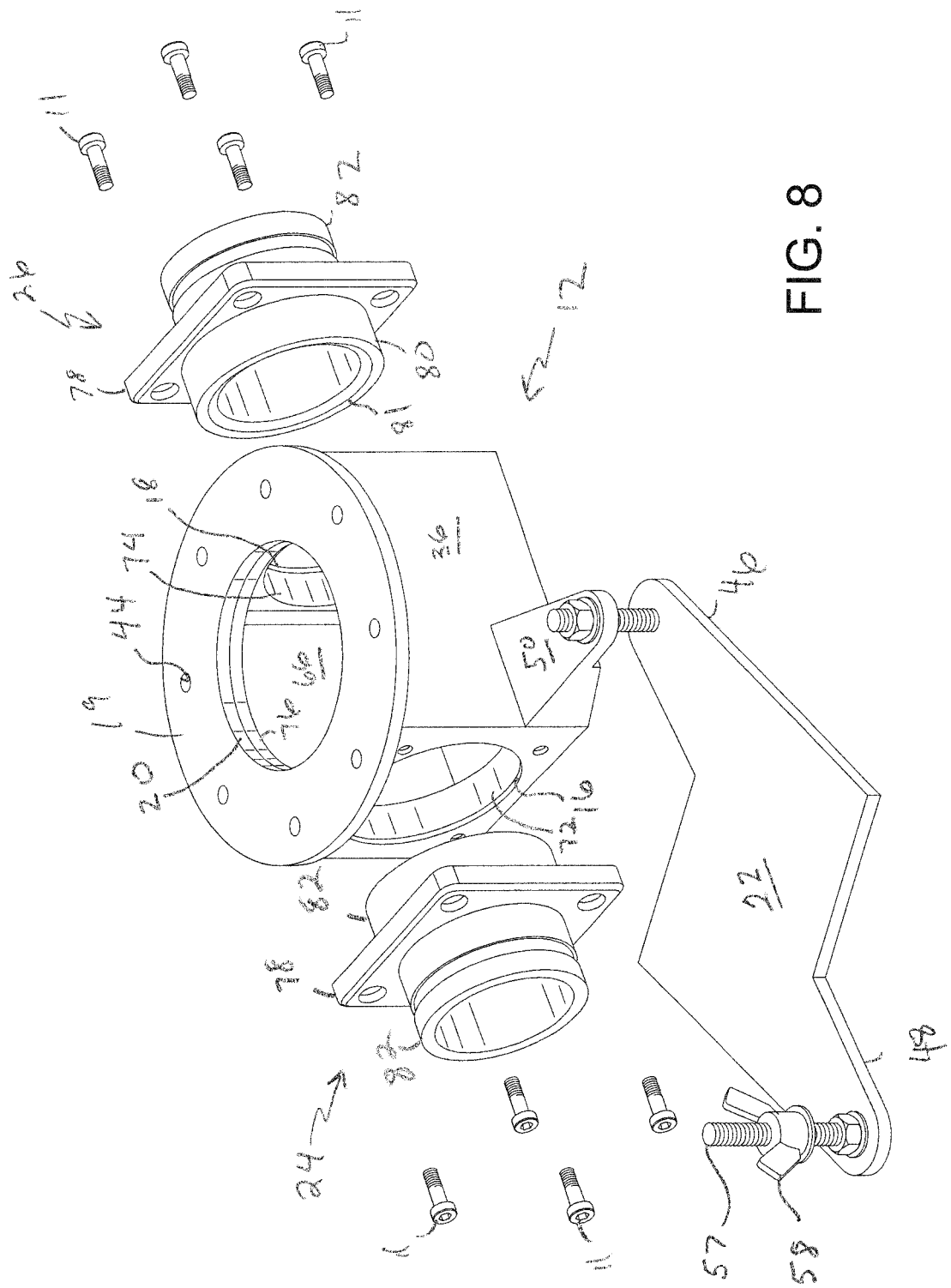
FIG. 8 is a partially exploded view of the first side of the hopper tee of FIG. 1.

The square enclosure defined by top wall 68 and vertical walls 30, 32, 34 and 36 of box 12 is selectively accessible through open bottom 14 by pivoting door 22 between an open orientation, as depicted in FIGS. 7 and 8, and a sealed, closed orientation, as depicted in FIGS. 4, 5 and 11. Door 22 is a square metal member having a first wing portion 46 and a second wing portion 48, each wing portion extending from a respective edge of the door. First wing portion 46 is pivotally coupled at point 47 to a first complementary wing 50 extending out perpendicularly from wall 36 of box 12. When in the closed orientation, second wing portion 48 and door 22 are rotated about point 47 so that a bolt opening 54 in second wing portion 48 becomes aligned with a slot 56 in second complementary wing 52. A bolt 57, which is fixed within bolt hole 54, and a wingnut 58 are used to immobilize door 22 in the closed orientation by tightening wingnut 58 against second complementary wing 52. When it is desired to uncover open bottom 14, either to access the interior of box 12 or gravity drop particulate materials through box 12, wingnut 58 is loosened, which allows door 22 to pivot into the open orientation.

Located within box 12 is liner 28. As depicted in FIG. 7, liner 28 covers the entirety of the inner surfaces of walls 30, 32, 34, 36 and 42 of box 12. To that end, liner 28 includes four vertical walls including a first complementary wall 60, a second complementary wall 62, a third complementary wall 64, a fourth complementary wall 66 and a top complementary wall 68 which covers and protects respective walls 30, 32, 34, 36 and 42 of box 12. Liner 28 further includes an open bottom 70, a complementary first sidewall opening 72, a second complementary sidewall opening 74 arranged opposite to and aligned with the first complementary sidewall opening and a complementary inlet 76, each of which is aligned with and configured for allowing access through respective openings 14, 16, 18 and 20 of box 12. As depicted in FIG. 7, each of complementary walls 60 and 62 has an increased thickness relative to walls 30, 32, 34 and 36 of box 12 and complementary walls 64 and 66 of liner 28. This is because portions of complementary walls 60 and 62, especially those sections that are adjacent the top edges of complementary openings 72 and 74, undergo greater wear when hopper tee 10 is in use than other portions of liner 28 that are not located in the primary pathway of the flowing particulate material. Preferably, complementary walls 60 and 62 of liner 28 are at least twice as thick as complementary wall 64 and 66.

Operatively coupled to complementary sidewall openings 72 and 74 are outflow adapter 24 and inflow adapter 26, respectively. It should be understood that outflow adapter 24 and inflow adapter 26 are interchangeable and identical to one another. What distinguishes adapters 24 and 26 is their orientation with hopper tee 10 when hopper tee 10 is coupled with a bulk hopper. An adapter is an outflow adapter when hopper tee 10 is arranged relative to the bulk hopper so that particulate materials exit box 12 through the adapter. An adapter is an inflow adapter when hopper tee 10 is arranged so that air and, optionally, particulate materials enter box 12 through the adapter.

Figure 9:
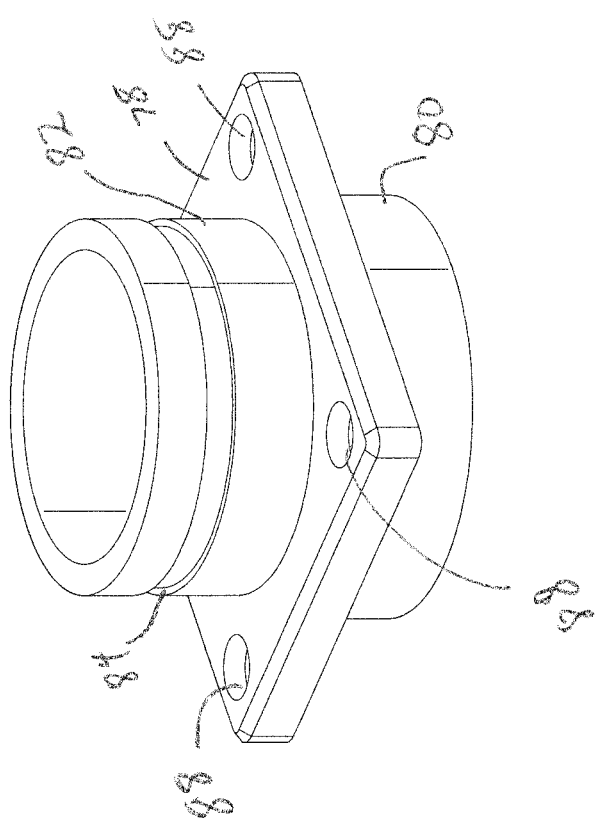
FIG. 9 is a perspective view of an adapter of the hopper tee of FIG. 1.
Figure 10:
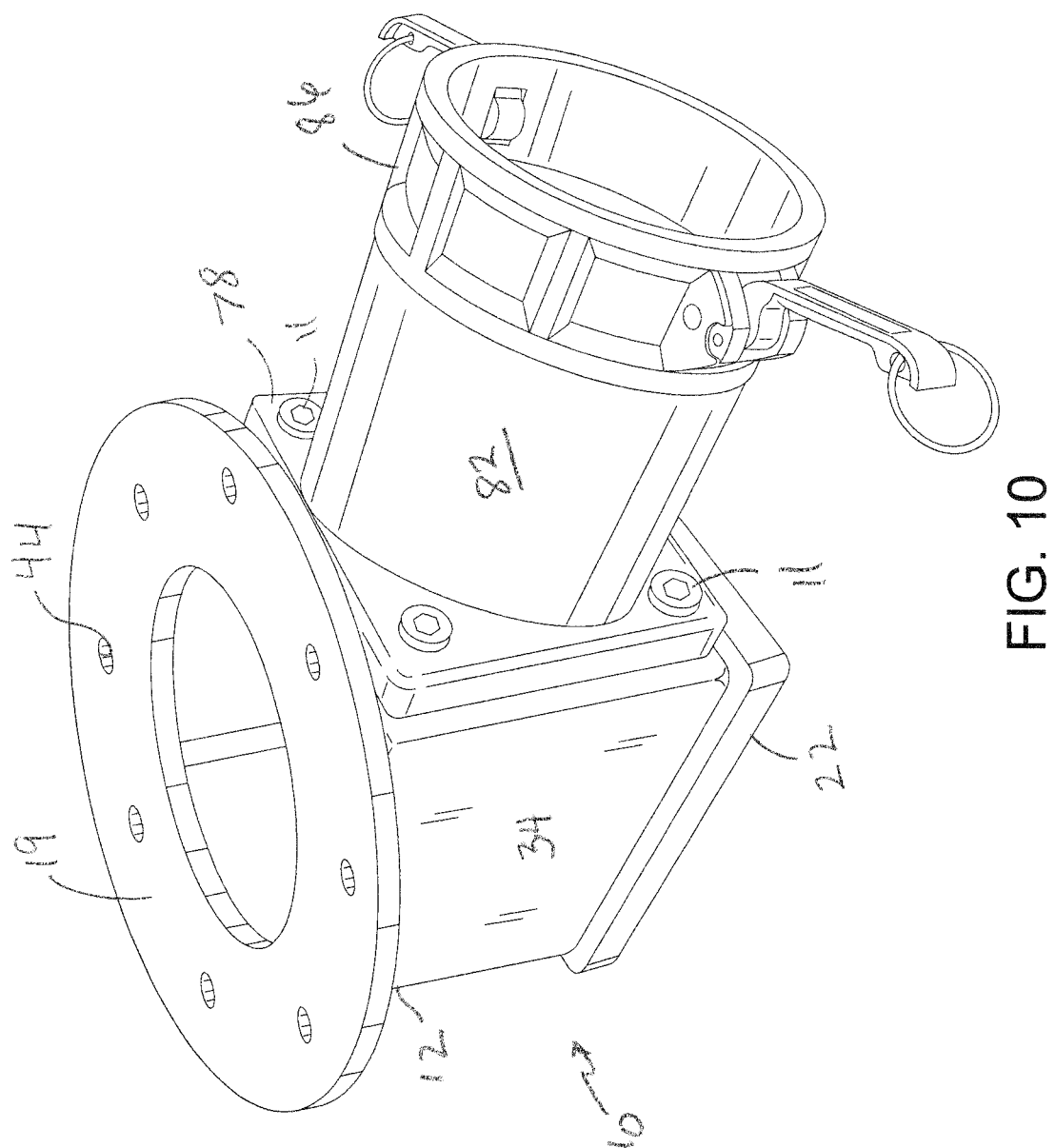
FIG. 10 is a perspective view of the hopper tee of FIG. 1 illustrating a Victaulic coupler coupled to an outflow adapter of the hopper tee.

Referring to FIG. 9, each of adapters 24 and 26 includes a flange portion 78 and a cylinder portion extending through the flange portion, the flange portion dividing the cylinder portion into a first cylinder portion 80 that is extends through first sidewall opening 16 and complementary first sidewall opening 72 and a second cylinder portion 82 that is located outside of box 12 and configured for coupling to a pipe. An annular depression 84 extends around second portion 82 thereby allowing the second portion to be coupled to the pipe using a Victaulic coupler 86, for example, as shown in FIG. 10. Thus, adapters 24 and 26 can be attached to and detached from inflow and outflow pipes of a bulk hopper system without having to weld or cut the pipes or the adpaters.

Figure 3:
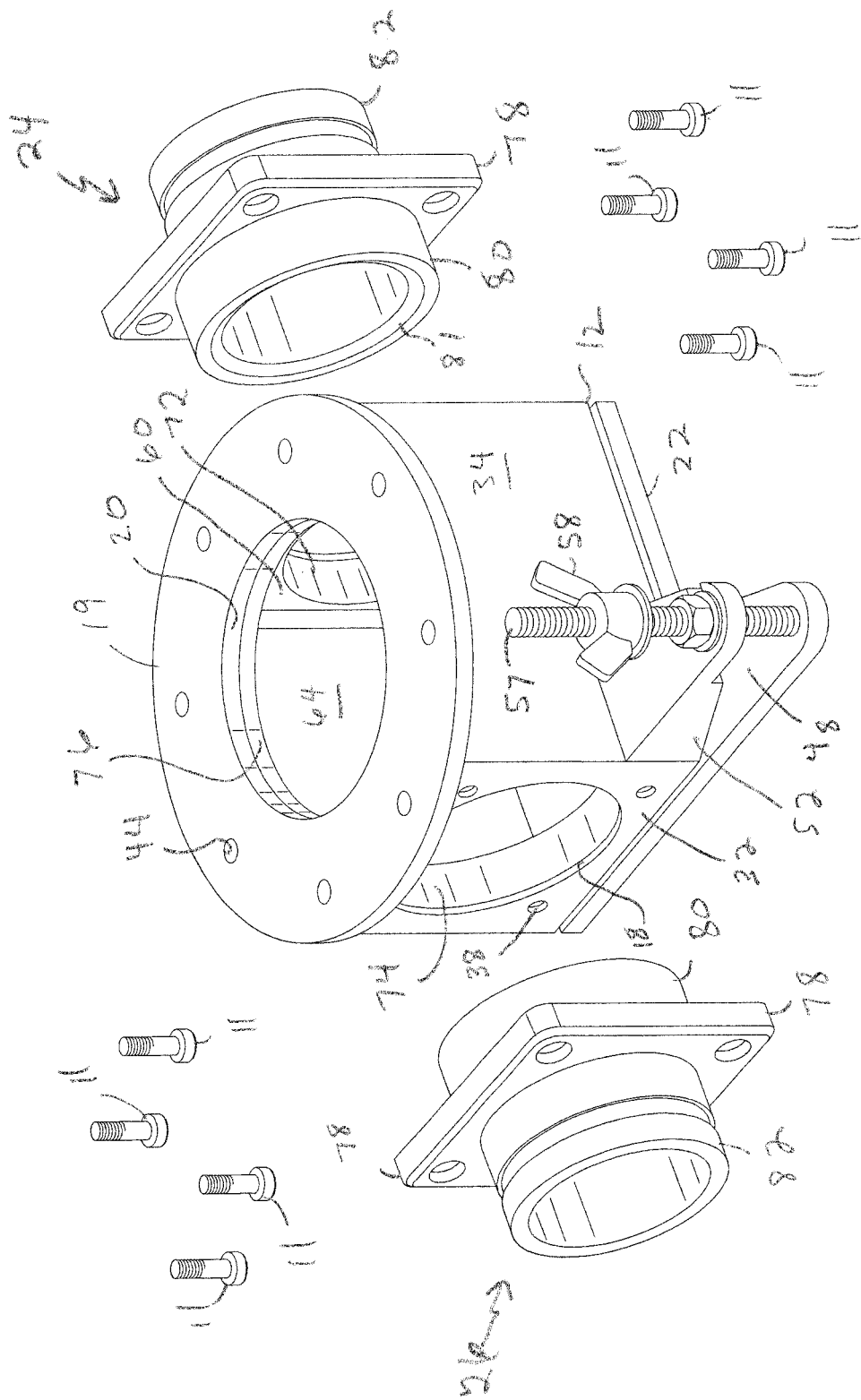
FIG. 3 is a partially exploded view of the hopper tee of FIG. 1.

Bolt holes 88 extend through flange portion 78 for attaching adapters 24 and 26 to box 12 using bolts 11. Bolts 11 extend through bolt holes 38 in box 12 and into liner 28. Each of bolts 11 has a threaded end portion which mates with threaded openings (not shown) in complementary walls 60 and 62 of liner 28. The threaded openings extend only partially through walls 60 and 62. As depicted in FIGS. 3, 8 and 11, first cylinder portion 80 has a free end that includes a curved or angled surface 81. When inserted into box 12 and liner 28, curved or angled surface 81 is flush with the inner surface of liner 28 (see 83 at FIG. 11). This ensures that no lip or overhang is present between the inner surface of the liner and the adapters which could exacerbate wearing of liner 28 or first cylinder portions of adapters 24 and 26.

An alternative adapter 90 is depicted in FIG. 12. Like adapters 24 and 26, adapter 90 can function as an outflow or an inflow adapter. Adapter 90 includes a reinforcing metal cylinder member 92. Metal cylinder member 92 is concentrically arranged with the cylinder portion of adapter 90. Specifically, metal cylinder member 90 is concentrically arranged around an outside surface of second portion 82 of adapter 90, so that it is exposed and forms an outer surface portion of the adapter, but it is embedded within first portion 80, so that plastic to plastic contact is made between adapter 90 and liner 28. Metal cylinder member 92 increases the rigidity of adapter 90, relative to adapters 24 and 26, and provides a metal surface with which Victaulic coupler 86 can directly engage thereby improving the strength and rigidity of attachment of the coupler to the adapter.

Figure 6:
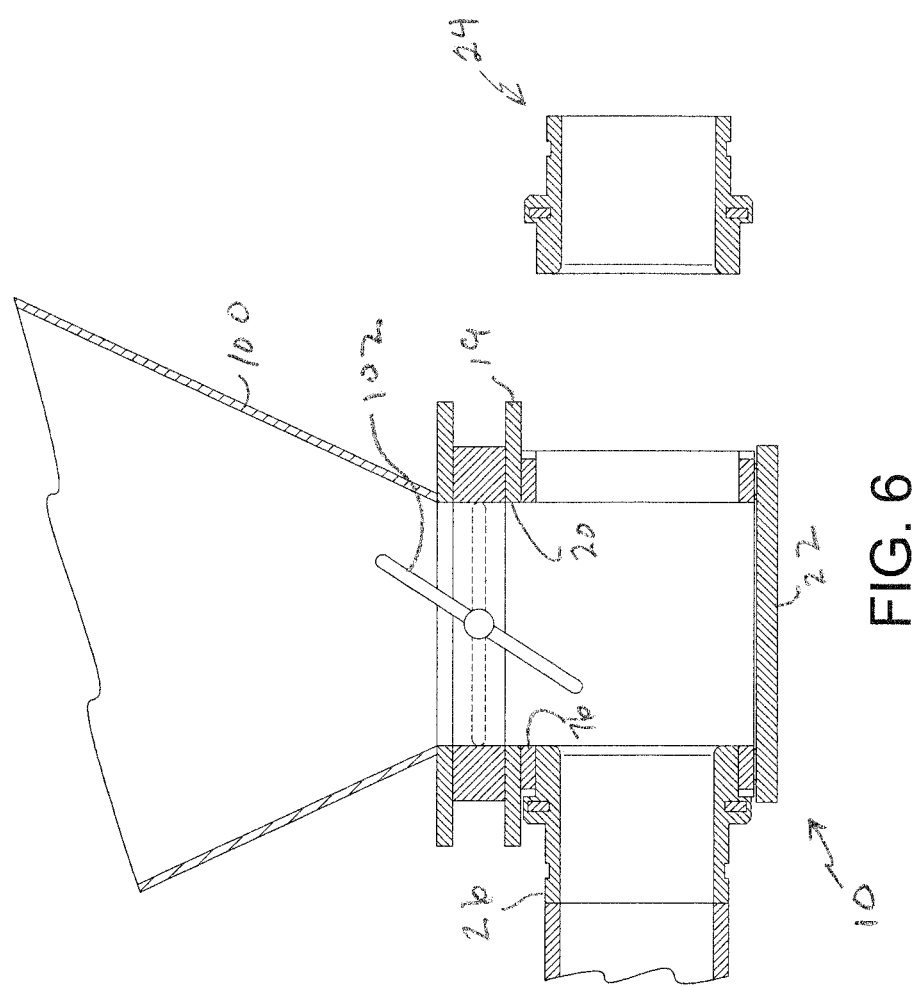
FIG. 6 depicts the outflow adapter of FIG. 5 detached from the hopper tee.

Referring to FIGS. 5 and 6, flange 19 is operatively coupled to a trailer bulk hopper 100. Bulk hopper 100 includes a butterfly valve 102 arranged to selectively empty dry, particulate material contents 104 of the bulk hopper through flange inlet 20 and complementary inlet 76 of liner 28 into box 12. Door 22 is arranged in an open orientation when hopper tee 10 is to be used for gravity dropping of particulate materials out of box 12 through open bottom 14. Door 22 is arranged in a closed orientation when hopper tee 10 is to be used as a straight tee for pneumatic conveyance of materials. In this instance, a flow of air enters into box 10 from a pipe 106 which is fluidly coupled with inflow adapter 26. Pipe 106 may carry only air, or in the instance where another hopper tee is located upstream of and in fluid communication with hopper tee 10, pipe 106 may carry particulate material entrained within the airflow. As the airflow passes through box 12, it forces contents 104 to exit box 10 through outflow adapter 24 and into another pipe 108. Pipe 108 may carry contents 104 to another hopper tee or deposit the contents at an unloading site.

As contents 104 pass through box 12, contents 104 cause wearing of liner 28 and outflow adapter 24, particularly along the top section of the free end of first cylinder portion 80 of the outflow adapter. According to the present invention, as portions of adapters 24 and 26 become worn they are independently replaced. For example, when outflow adapter 24 is damaged, the outflow adapter is unbolted from box 12 and uncoupled from pipe 108. The damaged outflow adapter is then removed from box 12 and replaced with another outflow adapter having the same design as outflow adapter 24. The damaged outflow adapter is thereby replaced without having to remove hopper tee 10 from bulk hopper 100. Since outflow adapter 24 wears at an increased rate relative to inflow adapter 26, it is possible to increase the operational life of hopper tee 10 without replacing any portion of the hopper tee by detaching hopper tee 10 from hopper 100 and pipes 106 and 108, rotating hopper tee 180° and reattaching hopper tee 10 to hopper 100 so that adapter 26 is now attached directly to pipe 108 and adapter 24 is attached to pipe 106.

When liner 28 becomes worn it can be replaced by any means known in the art. For example, box 12, with adapters 24 and 26 removed, can be heated to a temperature that is between the melting temperatures of the metal of box 12 and the plastic of liner 28 which thereby melts the liner so that it may flow out of the box. In those instances where liner 28 is molded within box 12, liner 28 can be removed from box 12 by heating the box and liner to a temperature sufficient to degrade the bonding agent thereby causing the liner to release from the box. Alternatively, liner 28 can be removed from box 12 be chipping or scraping portions of the liner away from box 12 using tools such as scrapers, grinders, screwdrivers and crowbars. After the damaged liner is removed, the inner surface of box 12 is sanded and cleaned, and a new liner 28 is located within box 12.

As will be apparent to one skilled in the art, various modifications can be made within the scope of the aforesaid description. Such modifications being within the ability of one skilled in the art form a part of the present invention and are embraced by the claims below.

It is claimed:

1. A method of repairing a modular hopper tee comprising:
   providing a hopper tee including a box having a sidewall, an upper opening, a lower opening, a first side wall opening and a second sidewall opening arranged opposite to the first sidewall opening, a damaged polymer adapter detachably coupled with the first sidewall opening, and a polymer liner covering an inner surface of the sidewall, wherein the damaged polymer adapter includes a flange portion and a cylinder portion extending through the flange portion, the cylinder portion including a first portion that extends through the first sidewall opening and the second portion that is located outside of the box,
   uncoupling the damaged polymer adapter from the hopper tee,
   uncoupling the damaged polymer adapter from a pipe, and
   coupling a second polymer adapter to and between the hopper tee and the pipe.

2. The method of claim 1 wherein uncoupling the damaged polymer adapter from the hopper tee includes unbolting the damaged polymer adapter from the hopper tee.

3. The method of claim 1 wherein coupling the second polymer adapter to and between the hopper tee and the pipe includes bolting the second polymer adapter to the hopper tee.

4. The method of claim 1 wherein uncoupling the damaged polymer adapter from the hopper tee, uncoupling the damaged polymer adapter from the pipe and coupling the second polymer adapter to and between the hopper tee and the pipe occur while the hopper tee is coupled to a bulk hopper.

* * * * *